United States Patent
Potvin

[11] 3,938,431
[45] Feb. 17, 1976

[54] ELECTRIC GRILL APPLIANCE

[76] Inventor: Alfred M. Potvin, 155 Denavare St., St. Lambert, Quebec, Canada

[22] Filed: Dec. 6, 1974

[21] Appl. No.: 530,073

[52] U.S. Cl. .................. 99/425; 99/446; 99/375; 219/463; 219/525
[51] Int. Cl.² .......................................... A47J 37/06
[58] Field of Search ........... 219/385, 462, 463, 464, 219/524, 525; 99/331, 375, 425, 99/446, 447, 448

[56] References Cited
UNITED STATES PATENTS

| | | | |
|---|---|---|---|
| 1,706,612 | 3/1929 | Jaeger | 99/375 |
| 1,839,112 | 12/1931 | Mills | 99/375 |
| 2,031,259 | 2/1936 | Fox | 219/525 UX |
| 3,245,337 | 4/1966 | White et al. | 99/331 |
| 3,418,919 | 12/1968 | Nardon | 219/525 X |
| 3,444,805 | 5/1969 | Happel et al. | 99/447 X |
| 3,714,885 | 2/1973 | Wertheimer et al. | 99/425 |
| 3,719,507 | 3/1973 | Bardeau | 99/375 |

*Primary Examiner*—Volodymyr Y. Mayewsky

[57] ABSTRACT

An electric grill appliance comprising a main body having a bottom wall, opposed side walls and a top plate of heat conductive material. The top plate has an outer cooking surface and an undersurface facing the bottom wall. At least one resistive heating element is secured directly to the undersurface for heating the top plate. The body is supported above the horizontal plane by support means. A container is removably secured under the bottom wall and has liquid collecting means extending outside one or more of the opposed side walls. The top plate has liquid dispensing means in at least one outside edge thereof to direct liquid on the top plate outer cooking surface into the liquid collecting flange of the container.

10 Claims, 5 Drawing Figures

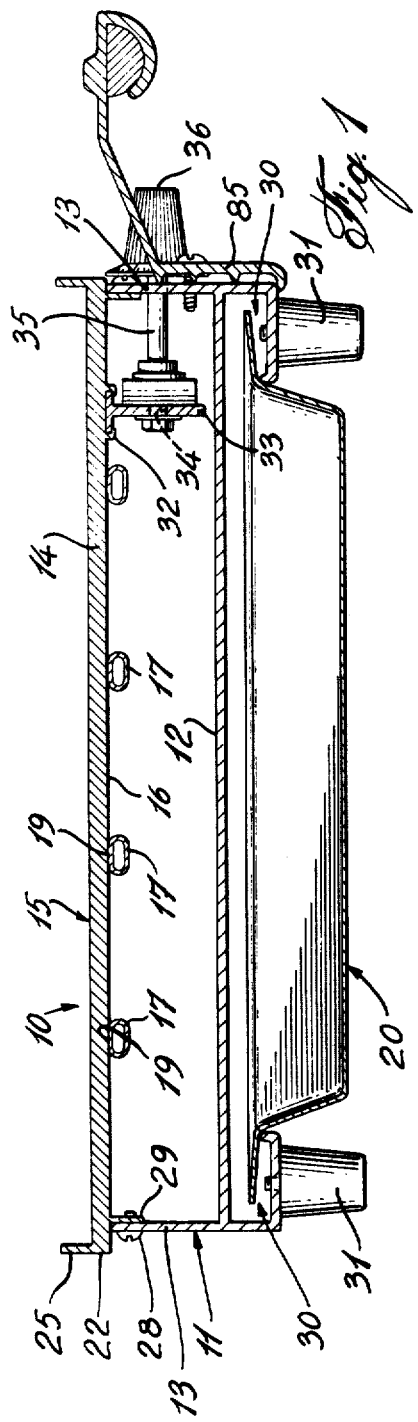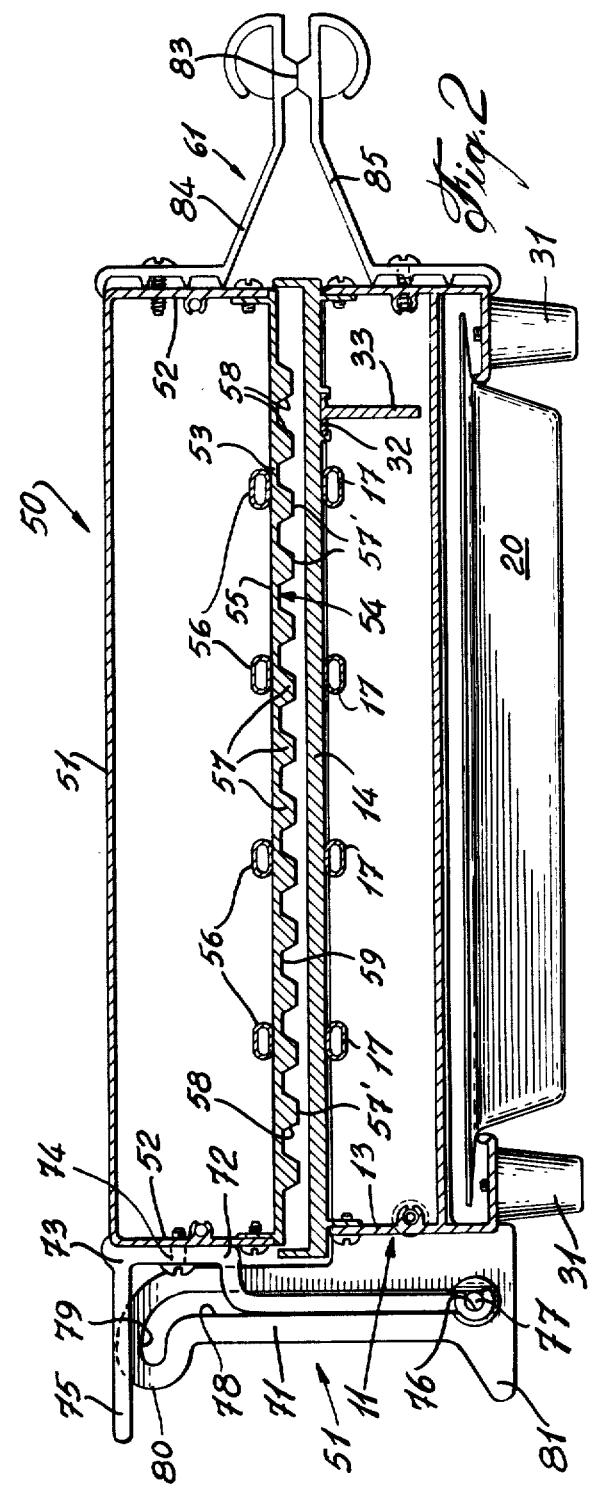

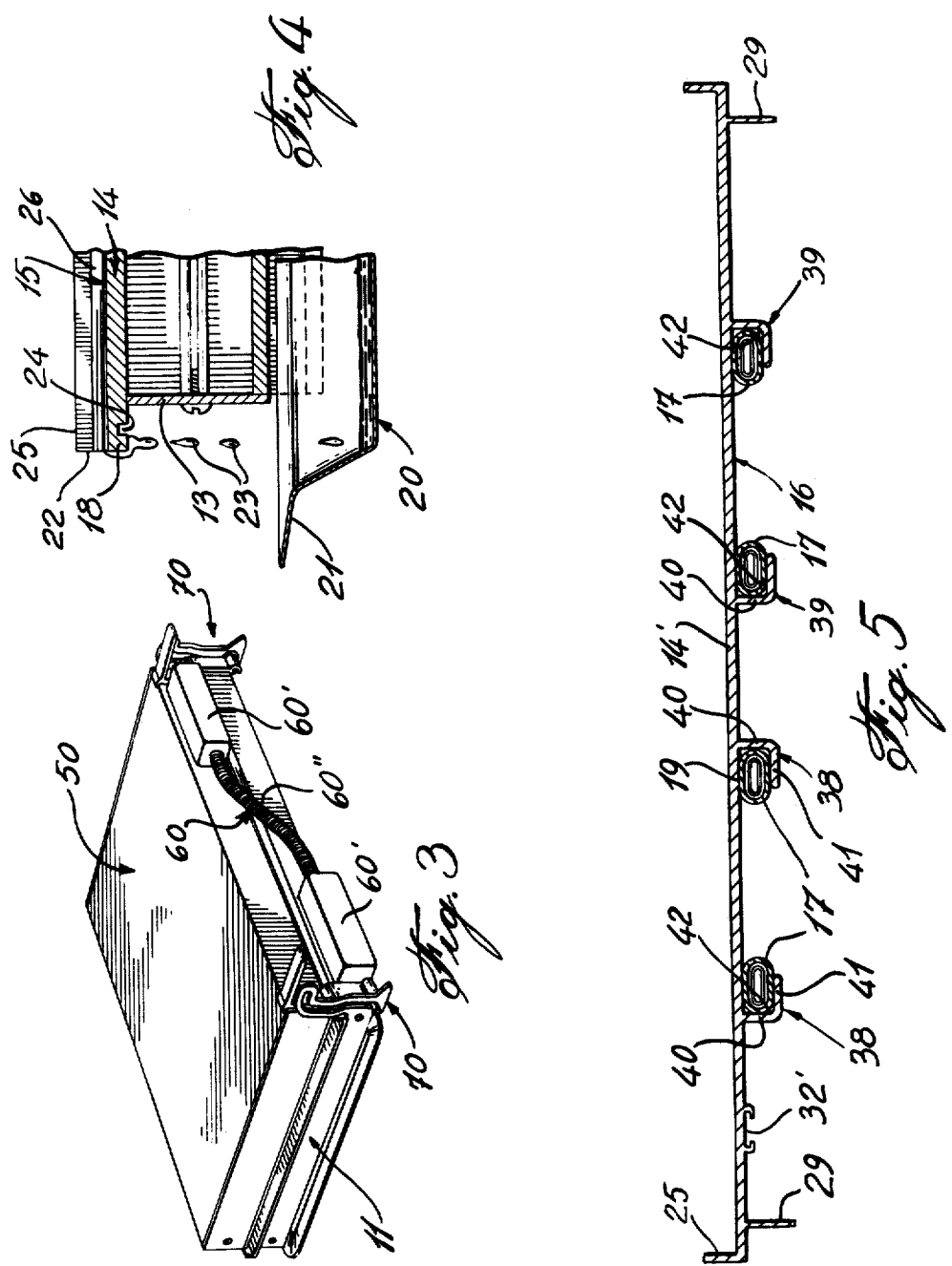

3,938,431

ELECTRIC GRILL APPLIANCE

BACKGROUND OF INVENTION a. Field of the Invention

The present invention relates to an electric grill appliance and more particularly to an improved grill appliance of the portable type.

b. Description of Prior Art

Various type electric grill appliances have been heretofore provided. However, a great many of these are very difficult to clean and cooking fat collects on their cooking surface with no provision for dispensing these fats as they are released on the surface in the process of cooking. Some electric grill appliances are very difficult to clean primarily due to their construction. Still further, the grill plates of prior art appliances do not provide maximum heat transfer between the resistive heating elements and the plates.

SUMMARY OF INVENTION

It is an object of the present invention to provide an electric grill appliance which substantially overcomes all of the above-mentioned disadvantages.

It is a further feature of the present invention to provide an electric grill appliance having a cooking surface with liquid dispensing means whereby to collect liquids, such as fats, which are released by foodstuff in the process of being cooked.

It is a still further feature of the present invention to provide an electric grill appliance which is easily assembled, easy to clean and substantially economical to manufacture.

According to the above features, from a broad aspect, the present invention provides an electric grill appliance, comprising a main body having a bottom wall, opposed side walls and a top plate of heat conductive material. The top plate has an outer cooking surface and an undersurface facing the bottom wall. At least one resistive heating element is secured directly to the undersurface for heating the top plate. The body is supported above the horizontal plane by support means. A container is removably secured under the bottom wall and has liquid collecting means extending outside one or more of the opposed side walls. The top plate has liquid dispensing means in at least one outside edge thereof to direct liquid on the top plate outer cooking surface into the liquid collecting flange of the container.

BRIEF DESCRIPTION OF DRAWINGS

The present invention will now be described with reference to the accompanying drawings which show a preferred embodiment of the invention and it is to be understood that obvious modifications can be made to parts thereof without departing from the scope of the invention as defined by the broad aspect thereof hereinabove mentioned.

FIG. 1 is a sectional fragmented view of a bottom body portion of the electric grill appliance of the present invention when viewed from the side;

FIG. 2 is a sectional side view of the electric grill appliance of the present invention hereinshown with bottom and top body portions;

FIG. 3 is a perspective view of the grill appliance;

FIG. 4 is a fragmented sectional view illustrating the positioning of the liquid collecting flange and the liquid collecting container relative to the grill plate; and FIG. 5 is a sectional view of the top heat conductive plate.

DESCRIPTION OF PREFERRED EMBODIMENTS

Referring now to the drawings and more particularly to FIG. 1, there is shown generally at 10, the electric grill appliance of the present invention. The appliance comprises a main body 11 having a bottom wall 12, opposed side walls 13 and a top cooking plate 14 constructed of heat conductive material, such as aluminum and having a top surface coating of "Teflon" (registered trade mark). The top plate 14 has an undersurface 16 facing the bottom wall 12. At least one resistive heating element 17, of suitable configuration, is secured directly to the undersurface 16 for heating the top plate 14.

The heating element 17 is normally shaped in a serpentine configuration and provided with end prongs (not shown) for connection of the element in series in an electrical circuit. The resistive element 17 is provided with at least one flat surface 19 along the length thereof and this surface is positioned in facial contact with the undersurface 16 of the top plate 14. The heating element 17 is welded by a welding compound (not shown) to the top plate on the surface 16 with the welding compound having a melting point much higher than the maximum temperature that the top plate 14 will be subjected to by the heating element 17 or the combination of the heating element 17 and a further juxtaposed heating plate when a top body portion (described later) is juxtaposed on the main body 11.

As shown in FIGS. 1 and 4, a container or tray 20 is removably secured under the bottom wall 12 and is provided with liquid collecting means, herein a flange 21, extending outside one or more of the opposed side walls 13. The top plate 15 is further provided with liquid dispensing means in at least one outside edge 22 thereof to direct liquid 23 on the surface 15 of the top plate 14 onto the liquid collecting flange 21 of the container 20. As hereinshown, the liquid dispensing means is a slot 24 formed in at least a portion of an edge 22 of the top plate 14 and extending beyond an associated one of the opposed side walls 13. The slot 24 is located in the undersurface 16 adjacent the outer edge 22 of the extension of the top plate 14 whereby liquid will flow on and about the outer edge 22 and will be caused to flow to the outer edge undersurface and fall by gravity onto the liquid collecting flange 21 as the liquid cannot flow upwardly into the slot 24. Thus, the liquid will drip into the tray 20 as shown in FIG. 4. The section 18 of the side edge 22 may also be extended downwardly beyond the undersurface 16, instead of providing the slot 24. The liquid would, of course, be directed to this section 18.

As shown in FIG. 1, the top plate 14 is provided with opposed parallel edges 22 and an upstanding flange 25 is formed integrally with the top plate 14 and extending above the outer cooking surface 15 and disposed along the parallel edges 22 with the exception of the edge or edge portion having the liquid dispensing means. The top surface or cooking surface 15 of the top plate 14 may also be provided with spaced apart ridges 26 (see FIG. 4) to provide a grilling effect on foodstuffs being cooked on the plate. When ridges 26 are provided a circumferential channel (not shown) is also formed about the inner top edges of the plate whereby fat from the foodstuff will flow along the channel to the outer periphery of the top plate having the dispensing means and be dispensed in the manner as above-described relative to FIG. 4.

As shown in FIG. 1, two opposed side walls 13 of the body 11 extend below the bottom wall 12 and are inwardly turned to provide opposed channels 30 to slidingly receive the container 20 under the bottom wall 12. Support legs 31 are also secured to the channels 30 whereby to support the main body 11 above a horizontal plane so that the tray-like container 20 may be slidingly inserted and removed from underneath the main body without interference. Bearing surface means may also be provided within a convenient location in the channels 30 whereby to provide smooth insertion and removal of the tray 20. Also, although not shown, the tray 20 may be provided with handle means to facilitate manipulation thereof.

As shown in FIGS. 1 and 5, the top plate 14 is also provided with guide flanges 29 extending from the undersurface 16 and inwardly spaced from the outer edges 22 whereby to be received inside the side walls 13 of the main body 11 for securement to the side walls 13 by suitable fastening means, such as fasteners 28. Further, an undercut recess 32 is formed integral in the undersurface 16 of the top plate to define a conductive wall receiving channel 32' whereby to slidingly receive therein heat conducting flange 33. The flange 33 is provided with a cavity 34 therein wherein to receive, in frictional contact, a heat sensing arm 35 of a thermostat 36 to control the temperature of the plate 14. The power supply for the heating element 17 is normally provided through connections in the thermostat 36 and a plug in a side wall 13.

As shown in FIG. 5, in a further embodiment the top plate 14' is provided with two pairs of depending arms 38 and 39 each of which is defined by a vertical wall 40 and an inwardly facing wall 41 at the end thereof with each inwardly facing wall 41 of each pair of flanges facing each other to define opposed recesses 42 for frictional retention of portions of the heating element 17 therein. In this particular embodiment, the heating element 17 is provided with opposed flat surfaces 19 and the width of the recess 42 between the inner face of the horizontal wall 41 and the underface 16 is substantially equal to the width of the heating element 17 whereby to retain the element 17 in tight frictional fit therein.

Referring now to FIG. 2, there is shown a top body portion 50 secured by hinge means 51 to the main body portion 11. The top body portion 50 comprises a top wall 51, opposed side walls 52 and a detachable bottom plate 53 of heat conductive material. The bottom plate 53 has an outer cooking surface 54 and an undersurface 55 facing the top wall 51. At least one resistance heating element 56 is secured directly to the undersurface 55 in the manner as above described relative to the top plate 14 of the main body portion 11. The outer cooking surface 54 is hereinshown formed with a plurality of spaced apart ribs 57. The hinge means 51 in combination with handle means 61 provides for the heat conductive plate 53 of the top body portion 50 to be juxtaposed with the heat conductive plate 14 of the main body 11.

As shown in FIG. 2, the spaced apart ribs 57 on the heat conductive plate 53 have a flat upper surface 57' and outwardly tapering side faces 58 depending therefrom and extending to a flat surface 59 between opposed ribs 57. The resistive element 56 is also connected in series with the element 17 through an outside flexible connection 60 as shown in FIG. 3.

Referring now to FIGS. 2 and 3, the hinge means 51 is illustrated as consisting of hinge members 70 provided at opposed corners on one side of the main body and extending substantially the full height of both the main and the top body portions. Each hinge member 70 consists of two sections, a channel section 71 and a follower section 72. The follower section 72 is shown in FIG. 5 and consists of a vertical wall section 73 having a flat face and a bore 74 extending therethrough whereby to connect the wall section 72 to a side wall 52 of the top body portion 50. A horizontal extension portion 75 extends from the top edge of the section 73 and constitutes a support leg. The opposite end of the follower section 72 is provided with a circular transverse recess 76 whereby to receive and retain a follower pin 77 extending therethrough and through a channel 78 provided in the channel section 71.

The channel section 71 extends substantially longitudinally vertically for vertical displacement of the top body portion 50 relative to the main body portion 11. The channel section 71 is secured to the side wall 13 of the main body portion 11. The upper portion 79 of the channel 78 is outwardly curved whereby the top body portion 50 may be held hinged outwardly from the main body. The interconnection means 60 as shown in FIG. 3 consists of terminal housings 60' and a flexible channel 60" whereby to permit the top body portion 50 to be hinged outwardly.

As shown in FIG. 2, the support leg 75 extends outwardly from the side wall 52 of the top body portion and terminates substantially in the same plane as the outer edge 80 of the hinge channel section 71. The channel section 71 is further provided with a support leg section 81 at its bottom end and extending outwardly from the side wall 13 to also constitute a supporting leg having an outer edge lying in the same plane as the edge 80. Thus, it is possible to store the appliance vertically on the outer edges of the hinges.

The handle means 61 is provided with an interlocking connector 83 whereby to provide retention between handle sections 84 and 85. Thus, when the grill is stored in a vertical position as above described, the main body portion and top body portion will not separate. Of course, the handles also provide the means for opening the grill and for carrying same. Further, as shown, the handle section 85 is secured to a side wall 13 of the main body portion 11 whilst the handle section 84 is secured to an adjacent side wall 52 of the top body portion 50.

I claim:

1. An electric grill appliance comprising a main body having a bottom wall, opposed side walls and a top horizontal plate of heat conductive material, said top plate having an outer cooking surface and an undersurface facing said bottom wall, at least one resistive heating element secured directly to said undersurface for heating said top plate, said body being supported above a horizontal plane by support means, a container removably secured under said bottom wall and having a liquid collecting flange extending outside one of said opposed side walls, a slot formed along a portion of an outside edge of said top plate extending beyond an opposed side wall, said slot being located in said undersurface adjacent the outer edge of said extension whereby hot liquid flowing on and about said outer edge will be caused to flow to the outer edge undersurface and be arrested to collect in droplets and fall by gravity onto said collecting flange and directed into said container under said bottom wall of said main body.

2. An electric grill as claimed in claim 1 wherein said top plate has opposed parallel edges, an upstanding flange formed integrally with said top plate and extending above said outer cooking surface and disposed along at least three of said parallel edges, said container collecting flange being located below at least an edge free of said flange.

3. An electric grill as claimed in claim 1 wherein two opposed side walls of said body extend below said bottom wall and are inwardly turned to provide opposed channels to slidingly receive said container therebetween.

4. An electric grill as claimed in claim 1 wherein said resistance heating element is provided with at least one flat surface along the length thereof, said flat surface being secured in facial contact with said undersurface of said top plate.

5. An electric grill as claimed in claim 4 wherein said heating element is welded by a welding compound to said top plate undersurface, said welding compound having a melting point higher than the maximum top plate temperature.

6. An electric grill as claimed in claim 1 wherein said top plate undersurface is provided with opposed flanges having vertical arms equally spaced apart and an inwardly facing arm integrally formed with said vertical arm to define opposed recesses for frictionally retaining said heating element therealong.

7. An electric grill as claimed in claim 1 wherein a heat conductive plate depends from said top plate undersurface, a thermostat secured to one of said side walls and having a heat sensing arm extending under said top plate and in frictional contact with a cavity in said heat conductive plate.

8. An electric grill as claimed in claim 1 wherein a top body portion is hinged with said main body, said top body portion having a top wall, opposed side walls and a bottom plate of heat conductive material, said bottom plate having an outer cooking surface and an undersurface facing said top wall, at least one resistance heating element secured directly to said undersurface of said bottom plate, a hinge interconnecting said top body portion to said main body whereby both said top plate and said bottom plate cooking surfaces can be positioned in substantial juxtaposition.

9. An electric grill as claimed in claim 8 wherein said outer cooking surface of at least one of said top plate or said bottom plate has an undulated surface formed by a plurality of spaced apart ribs having a flat upper face and outwardly tapering side faces depending therefrom and extending to a flat surface between opposed ribs.

10. An electric grill as claimed in claim 8 wherein a hinge is provided at opposed corners on one side of said main body, said hinge extending substantially the full height of both said main and top bodies, leg supporting formations at opposed ends of said hinge whereby to support both said bodies upwardly from a common side wall, and a handle section secured to a side wall of each said bodies and opposite to said common side wall, said handle sections being provided with interlocking means.

* * * * *